(12) United States Patent
Goering et al.

(10) Patent No.: US 6,421,991 B1
(45) Date of Patent: Jul. 23, 2002

(54) DOFFER FOR A COTTON CLEANER

(75) Inventors: Kevin Jacob Goering, Cambridge; Jeffrey Scott Wigdahl, Ames, both of IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/669,291

(22) Filed: Sep. 26, 2000

(51) Int. Cl.⁷ .............................. A01D 46/08; A46B 3/08
(52) U.S. Cl. ............................................. 56/28; 15/183
(58) Field of Search ..................... 56/28, 14.1, 14.4, 56/48, 127, 16.4, 16.6, 40, 36; 15/179, 182, 183, 82; 403/374.3, 374.1

(56) References Cited

U.S. PATENT DOCUMENTS

| | | | | |
|---|---|---|---|---|
| 3,225,389 A | * | 12/1965 | Jones | 15/183 |
| 3,228,053 A | * | 1/1966 | Horton et al. | 15/183 |
| 3,241,172 A | * | 3/1966 | Tilgner | 15/183 |
| 3,512,237 A | * | 5/1970 | Elder et al. | 56/28 |
| 3,862,462 A | * | 1/1975 | Reiter | 15/182 |
| 4,214,346 A | * | 7/1980 | McDonald | 15/183 |
| 4,606,177 A | | 8/1986 | Schlueter | 56/30 |
| 5,490,301 A | * | 2/1996 | Droeser et al. | 15/183 |
| 5,819,357 A | * | 10/1998 | Gould | 15/182 |
| 5,933,907 A | * | 8/1999 | Drumm | 56/183 |
| 6,148,594 A | * | 11/2000 | Heaton et al. | 56/28 |
| 6,217,124 B1 | * | 4/2001 | Jespersen | 15/179 |

* cited by examiner

Primary Examiner—Robert E. Pezzuto
Assistant Examiner—Nathan Mammen

(57) ABSTRACT

A doffer assembly for doffing cotton from the saw drum of a cotton cleaner includes a plurality of brushes supported by channels and clamps in a drum configuration. A first nut on an easily accessible radial retaining bolt tightened against a special clamp secure the brush in place, and the same bolt and a second nut hold the corresponding doffer channel. The special clamp has a first leg positioned over a corner of the channel so the brush is held securely. A second brush-protecting leg extending up in front of the brush removes foreign matter that lodges on the saw drum. The channels are protected by the clamp, and the clamp is easily replaceable if damaged.

15 Claims, 3 Drawing Sheets

DOFFER FOR A COTTON CLEANER

BACKGROUND OF THE INVENTION

1.) Field of the Invention

The present invention relates generally to cotton cleaning equipment, and, more specifically, to a doffer for a cotton cleaner.

2.) Related Art

Some cotton harvesters, such as the type shown in U.S. Pat. No. 4,606,177 assigned to Deere & Company, include a cotton cleaner for separating seed cotton from trash. The cleaner includes primary and reclaimer saw drums, each having numerous saw tooth discs incrementally spaced along a transverse driven shaft. Seed cotton and trash enter the cleaner and are propelled through a narrow longitudinal opening defined by the outer diameter of the drum, two end walls of the cleaner housing and a lay-down bar. The lay-down bar presses the cotton upon the rotating saw teeth of the primary drum. As the primary drum rotates at high speed, the saw teeth snag the uncleaned cotton and force it through the narrow opening. The snagged cotton is impelled against several radially spaced bars to further enhance the separation of the trash from the seed cotton. The reclaimer drum snags cotton that gets by the primary drum.

A doffer with brushes is rotated at a speed greater than the speed of the primary and reclaimer drums against the tooth discs to dislodge the snagged cotton and propel it towards a conveying duct. The brushes are typically on the order of 1.25 inches (3.2 cm.) tall, and are held by a steel support located behind the brushes. The steel support also acts to dislodge foreign materials such as sticks from the primary drum. Several problems exist with such a brush doffer arrangement. The steel supports often act as a shearing edge that actually cuts off the bristles of the brushes when an obstacle is encountered requiring replacement of the brushes. The brush mounting includes channels secured to cylindrical supports with bolts, and the brushes are attached to the flanges with clamps and additional bolts which extend generally circumferentially through the flanges. These additional bolts are located close to the cylindrical supports and are very difficult to access. Two wrenches must be held close to the saw drums while changing brushes, and there is insufficient space to use a socket with a ratchet or air tool. Therefore, mounting and removing the brushes requires a substantial amount of time and inconvenience. Taller brushes without steel supports are available which do not shear as easily, but without the steel support foreign material often remains stuck to the saws. The clamping bolts for the taller brushes are located even further inwardly than those on the shorter brushes so that access to the bolts for brush replacement is very difficult.

BRIEF SUMMARY OF THE INVENTION

It is therefore an object of the present invention to provide an improved cotton cleaner doffer assembly. It is a further object to provide such a doffer assembly which overcomes most or all of the aforementioned problems and is more efficient and more tolerant to foreign objects entering the cleaner than most previously available assemblies.

It is a further object of the present invention to provide an improved doffer assembly for doffing cotton from a cleaner saw drum. It is a further object to provide such a doffer assembly that is less susceptible to brush damage such as shearing and yet is able to clear foreign matter stuck on the drums.

It is another object of the present invention to provide an improved brush-type doffer assembly having brushes which are easier and faster to attach and remove than those for at least most previously available doffer assemblies. It is another object to provide such an improved assembly having fewer parts and lower cost. It is a further object to provide such an assembly having more easily accessed mountings. It is still another object to provide such an assembly which obviates non-radially extending bolts and the need for two wrenches during brush replacement.

A doffer assembly for doffing cotton from the saw drum of a cotton cleaner includes a plurality of brushes supported by channels and clamps in a drum configuration on cylindrical supports. A first nut on an easily accessible radial retaining bolt holds a doffer channel in position, and a second nut located on the same retaining bolt and tightened against a special clamp secures the brush in place. The special clamp has a first leg positioned over a corner of the channel so the brush is held securely. A second brush-protecting leg extending up in front of the brush removes foreign matter that lodges on the saw drum. The channels which are an integral part of the doffer structure are protected by the clamp for better drum integrity, and therefore there is less opportunity for dirt to collect on the inside of the doffer and cause imbalance in the doffer. The clamp can be easily replaced if damaged. The main structural components are protected by the easily replaced clamps.

The upstanding leg of the clamp protects the brush in the forward direction of doffer rotation. Shear edges behind the brush are eliminated to allow the brush to flex out of the way without damage if a large obstruction is encountered.

The doffer assembly provides better performance and increased tolerance of foreign material on the saw drum. The radial bolt with dual support functions reduces hardware and makes changing brushes easier and quicker than with previously available doffer constructions. A single wrench is all that is necessary for brush changes, and access to the nuts is in an open area away from the saw drum so a socket and ratchet or impact gun can be used for the changes.

These and other objects, features and advantages of the present invention will become apparent to one skilled in the art upon reading the following detailed description in view of the drawings.

DETAILED DESCRIPTION OF THE DRAWINGS

Figure 1:
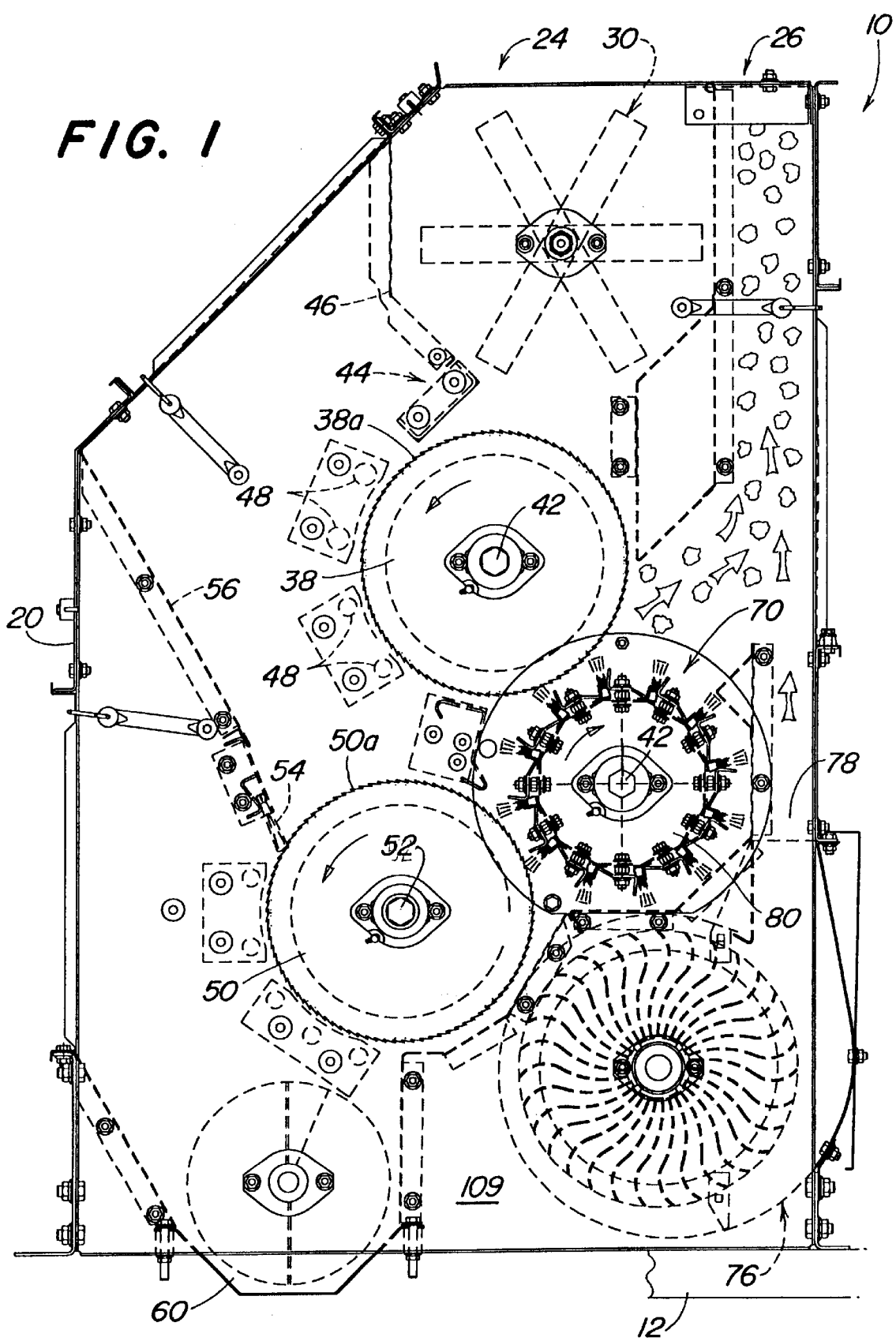
FIG. 1 is a left-hand side elevation of a cotton cleaner partially broken away to more clearly show the details of the cleaning and conveying structure.

Referring now to FIG. 1, therein is shown a cotton cleaner 10 supported on a frame 12 of a cotton harvester such as a cotton stripper (not shown) which is generally of the type shown and described in the aforementioned U.S. Pat. No. 4,606,177. With the exception of doffer structure described in detail below, the cleaner 10 is also generally of the same type of construction as that shown and described in the patent. The cleaner 10 includes an upright housing 20 having an inlet portion 24 opening downwardly into the top of the cleaner 10 and an outlet duct 28 leading upwardly to the structure for directing cleaned cotton into a basket (not shown) on the frame 12. The inlet portion 24 distributes material uniformly across the width of the cleaner 10 onto a feeder shaft 30 extending between sidewalls 10a of the cleaner. A primary saw cylinder or drum 38 is supported for rotation about an axis 42a (FIG. 2) below and parallel to the feeder shaft 30 by a shaft 42 extending between the cleaner sidewalls (10a). A lay-down bar assembly 44 is supported adjacent a lower edge of a panel 46 between the sidewalls 10a. The bar assembly 44 is located adjacent the forward upper quadrant of a toothed periphery 38a of the primary drum 38 and urges harvested material against the periphery. Grid bars 48 are offset radially from the drum 38 below the assembly 44. As the drum 38 is rotated at a high speed, cotton is snagged by the toothed periphery 38a and is forced through the narrow opening defined between the assembly 44 and the periphery. The snagged cotton is impelled against the bars 48 to separate the trash from the cotton.

A reclaimer saw cylinder or drum 50 similar in structure and operation to the drum 38 is supported for rotation by a shaft 52 parallel to the shaft 42. The reclaimer drum 50 is located below and slightly forwardly of the primary drum 38. A brush assembly 54 is supported adjacent the upper forward quadrant of the drum 50 at the lower edge of a sloped panel 56 and brushes cotton lint against toothed periphery 50a. Grid bars 58 similar to the bars 48 are supported adjacent the periphery 50a to separate trash from cotton lint. The separated trash and foreign objects fall to an auger assembly 60 which conveys the separated material out of the cleaner 10.

The cotton lint snagged on the peripheries 38a and 50a of the primary and reclaimer drums is intercepted by a doffer 70 mounted on a shaft 72 for rotation between the cleaner sidewalls 10a generally behind and between the drums 38 and 50. The doffer 70 doffs the cotton from the drums 38 and 50 and directs it into an upwardly directed airstream from a fan 76 and fan outlet duct 78. The cleaned cotton is directed through the cleaner outlet duct 28 back towards the basket. Further details of the cleaner structure and cotton conveying system may be had by reference to the aforementioned U.S. Pat. No. 4,606,177.

Figure 2:
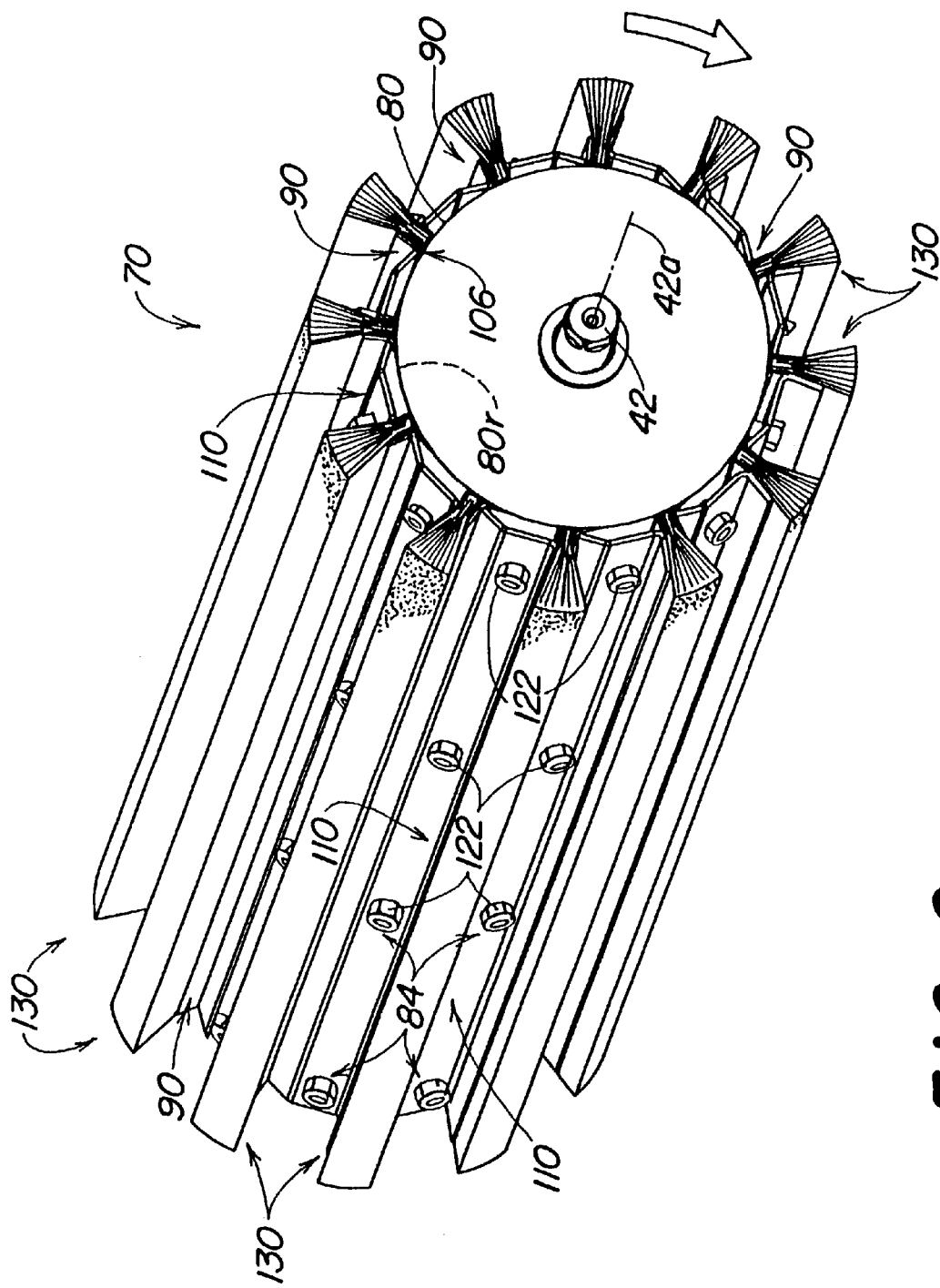
FIG. 2 is an enlarged perspective view of the brush-type doffer assembly of the cleaner of FIG. 1.

The doffer 70 includes a plurality of rimmed disks or hubs 80 with narrow cylindrical rims 80r connected for rotation with the shaft 42 about the axis 42a in a forward direction (arrow). A plurality of thread forming bolts or screws 84 with headed ends 86 and threaded ends 88 self-tap into the rims 80r so the threaded ends project radially from the rims. The screws 84 are uniformly spaced around the rims 80r. As shown in FIG. 2, four hubs 80, each with twelve radially projecting screws, are uniformly spaced along the length of the shaft 42.

Figure 3:
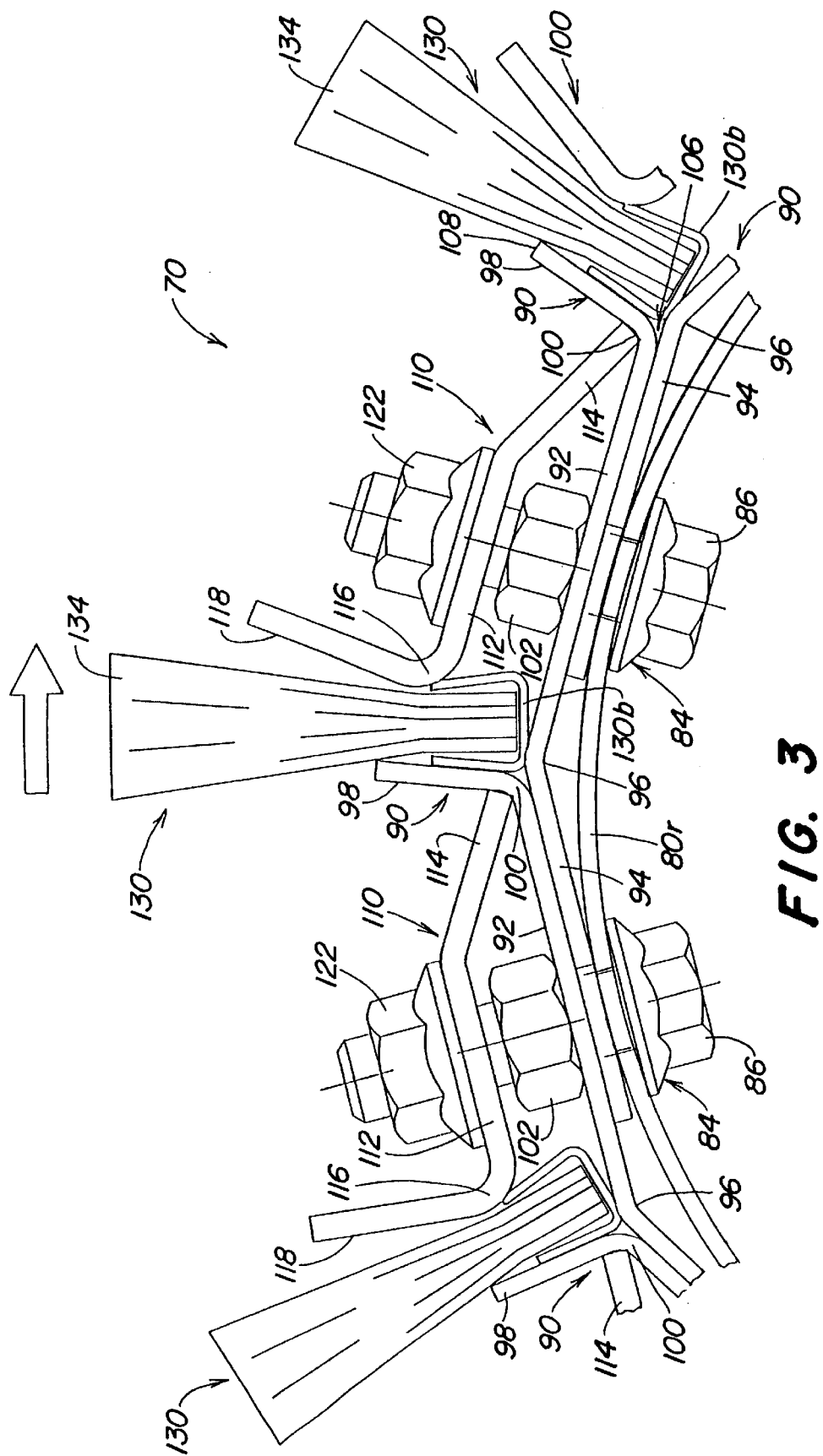
FIG. 3 is an enlarged end view of a portion of the doffer assembly of FIG. 2 showing the details of the brush mounting structure.

Overlapping or interleaved channel-forming members 90 (FIG. 3) extend axially and provide substantial structural integrity to the doffer 70. Each member 90 has a length generally equal to the length of the doffer 70 and includes a central flat portion 92 which is apertured for receipt by a row of the screws 84. The member 90 includes a trailing flat portion 94 which angle radially inwardly at a rear bend location 96 and is apertured for receipt by the next row of the screws 84. A flange 98 extends upwardly at a forward bend location 100. Inner nuts 102 threaded onto the screws 84 sandwich the central flat portion 92 of one of the members 90 over the trailing flat portion 94 of the preceding member 90 so that the members 90 are interleaved in uniform fashion as shown in FIG. 3. The flat portions 92 and 94 are generally parallel to each other and extend tangentially to the circumference of the supporting rims 80r. The bend locations 96 and 100 of adjacent members 90 define a brush-receiving corner indicated generally at 106. The flanges 98 have upper edges 108 offset radially a first distance above the rim 80r.

A special axially extending panel-like clip or clamp 110 includes an apertured flat central portion 112, a leading down-turned end 114, and a bend location 116 connecting an upturned flange 118 with an upper edge 120 to the rear of the central portion 112. The apertures in the portion 112 are received by a row of the screws 86, and second nuts 122 are tightened against the central portion 112 to urge the end 114 against the bend location 100 to secure member 90. The bend location 116 is held firmly against a generally U-shaped base 130b of an axially extending brush insert 130. A plurality of the inserts 130, one at each row of brush-receiving corners 106, are equally spaced around the peripheries of the rims 80r.

Each brush insert 130, which is approximately two inches (5.1 cm) tall, includes upstanding bristles 134 held by the base 130b. The trailing leg of each base 130b abuts the leading face of the adjacent flange 98, and the bend location 116 of the forwardly adjacent clamp 110 is firmly held against the top of the leading leg of the base 130b. The upper edge 120 of the flange 118 is offset radially a substantial distance above the base 130b and above the edge 108 of the flange 98. As shown in FIG. 3, the edge 120 is above the center of the bristles 134 and the edge 108 is offset only slightly above the base 130b. The flange 118 protects the brush insert 130 from damage by foreign materials on the toothed peripheries 38a and 50a of the drums 38 and 50. Any foreign materials stuck to the drums are cleared by the flanges 118. The bristles 134 can deflect rearwardly out of the way of an obstruction without being forced against a shear edge, and brush life is thereby extended. If a very large obstacle is encountered, the clamp 110 can deform, without deformation of the members 90 which define channel-shaped stiffening ribs and provide substantial structural integrity to the doffer 30. A damaged clamp 110 is very easy to access and replace, as is a worn or damaged brush insert 130. A single nut 122 on each radially projecting screw 84 in the row of screws holding the clamp 110 is accessed by a socket and ratchet or impact tool and removed so the clamp in question can be lifted from the threaded ends of the screws 84 for replacement or for removal and replacement of the brush insert 130. After replacement of the damaged or worn component, the nuts 122 are tightened against the top of the clamp 110 to secure the brush insert 130 in position. If desired, a foam strip or the like can be added between the clamp 130 and the channel defined between adjacent flanges 98 to prevent dirt accumulation that could cause imbalance in the doffer 70.

Having described the preferred embodiment, it will become apparent that various modifications can be made without departing from the scope of the invention as defined in the accompanying claims.

What is claimed is:

1. Cotton doffer structure for doffing cotton snagged on a surface along with debris, the cotton doffer structure including:
   a plurality of brushes, each brush having an inner base end supporting upstanding bristles and opposite distal end;
   a plurality of brush support members spaced to define a drum with a periphery rotatable in a forward direction about a drum axis, the brush support members securing the base ends of the brushes relative to the periphery, and wherein the brushes also having a leading side generally facing the forward direction and a trailing side opposite the leading side; and wherein the brush support members include an upright flange located adjacent the leading side and having an upper boundary projecting above the base end forwardly of the bristles, thereby protecting the bristles from damage when debris is encountered by the doffer structure, the flange also acting to dislodge the debris from the surface and a rear flange having a trailing boundary located rearwardly of the trailing side and radially inwardly from the upper boundary so that the bristles can deflect rearwardly without being forced against the trailing boundary thereby preventing pinching of the bristles against the trailing boundary.

2. The doffer structure as set forth in claim 1 wherein the inner base end includes a U-shaped base having leading and trailing sides, and wherein the rear flange includes an upper edge located radially outwardly of the base and radially inwardly of the upper boundary of the upright flange.

3. The doffer structure as set forth in claim 1 wherein the brush support members include a bolt, a first channel member connected to the bolt by a first nut, and a clamp member connected to the bolt and securing the base end of the brush against the first channel member.

4. The doffer structure as set forth in claim 3 wherein the clamp member defines the upright flange.

5. The doffer structure as set forth in claim 3 wherein the brush support includes a cylindrically shaped base member, and the bolt extends radially from the base member.

6. The doffer structure as set forth in claim 3 wherein the clamp member is connected to the bolt by a second nut located outwardly of the first nut.

7. Cotton doffer structure for doffing cotton snagged on a surface where debris is present, the cotton doffer structure including:
   a plurality of brushes, each brush having an outwardly opening U-shaped inner base end with a leading leg and a trailing leg;
   a plurality of brush support members spaced to define a drum with a periphery rotatable in a forward direction about a drum axis, the brush support members securing the base ends of the brushes relative to the periphery with the brushes projecting radially outwardly from the base ends, and wherein each of the brushes has a leading side generally facing the forward direction and a trailing side opposite the leading side; and
   wherein the brush support members each include an upright flange located adjacent the leading side and having an upper boundary projecting above the leading legs forwardly of the bristles, thereby protecting the brushes from damage when debris is encountered by the doffer structure, and wherein each of the brush support members also includes a rear flange having a trailing edge rearwardly of and radially inwardly of the upper boundary so the bristles can deflect rearwardly without being forced against the trailing edge thereby preventing pinching of the brushes when the debris is encountered.

8. The doffer structure as set forth in claim 7 wherein the upright flange projects radially outwardly of the U-shaped inner base end.

9. The doffer structure as set forth in claim 7 wherein the rear flange projects radially outwardly of the U-shaped inner base end.

10. The doffer structure as set forth in claim 7 wherein the upright flange and the rear flange project radially outwards of the U shaped inner base end.

11. The doffer structure as set forth in claim 7 wherein the rear flange projects radially outwardly above the trailing leg so that the leading and trailing legs are protected from debris by the front and rear flanges.

12. Cotton doffer structure for doffing cotton snagged on a surface in an environment where debris is present, the cotton doffer structure including:
   drum structure rotatable in a forward direction;
   a plurality of brushes supported from the drum structure for movement adjacent the surface, each brush having a support base with front and rear legs and bristles extending radially outwardly from the support base between the legs; and
   the drum structure including leading flanges projecting radially above the support bases adjacent the front legs to protect the brushes from the debris, the structure further including trailing flanges having upper boundaries located radially inwardly from the leading flanges so the bristles can deflect rearwardly with passing of the debris without being pinched against the trailing flanges.

13. The cotton doffer structure as set forth in claim 12 wherein the leading and trailing flanges contact opposite legs of the support bases and secure the brushes to the drum structure.

14. The cotton doffer structure as set forth in claim 13 wherein the leading flange includes a bend location abutting the front legs.

15. The cotton doffer structure as set forth in claim 12 wherein the trailing flanges include upright portions lying generally parallel to the rear legs.

* * * * *